(12) United States Patent
Ireland et al.

(10) Patent No.: US 10,365,294 B2
(45) Date of Patent: Jul. 30, 2019

(54) SENSOR FOR HIGH TEMPERATURE TURBULENT FLOW

(71) Applicant: ISIS Innovation Limited, Oxford (GB)

(72) Inventors: Peter Ireland, Oxford (GB); Kamaljit Singh Chana, Oxford (GB)

(73) Assignee: Oxford University Innovation Limited, Oxford (GB)

(*) Notice: Subject to any disclaimer, the term of this patent is extended or adjusted under 35 U.S.C. 154(b) by 605 days.

(21) Appl. No.: 15/023,162

(22) PCT Filed: Sep. 5, 2014

(86) PCT No.: PCT/GB2014/052704
§ 371 (c)(1),
(2) Date: Mar. 18, 2016

(87) PCT Pub. No.: WO2015/040361
PCT Pub. Date: Mar. 26, 2015

(65) Prior Publication Data
US 2016/0238629 A1 Aug. 18, 2016

(30) Foreign Application Priority Data
Sep. 20, 2013 (GB) .................... 1316747.3

(51) Int. Cl.
G01P 5/10 (2006.01)
G01K 13/02 (2006.01)
G01M 15/10 (2006.01)
G01M 15/14 (2006.01)
(Continued)

(52) U.S. Cl.
CPC ................ *G01P 5/10* (2013.01); *F01D 17/08* (2013.01); *G01K 13/02* (2013.01);
(Continued)

(58) Field of Classification Search
CPC ........ G01P 5/10; G01P 13/006; G01M 15/14; G01M 15/102; G01K 13/02; G01K 2013/024; F01D 17/08
See application file for complete search history.

(56) References Cited

U.S. PATENT DOCUMENTS 3,991,616 A 11/1976 Stahli
4,016,759 A 4/1977 Baker et al.
(Continued)

FOREIGN PATENT DOCUMENTS

EP 0101119 A1 2/1984
EP 0267354 A1 5/1988
(Continued)

OTHER PUBLICATIONS

Schultz, D.L. and Jones, T.V., "Heat-Transfer Measurements in Short-Duration Hypersonic Facilities", AGARD-AG-165, 1973, (one hundred fifty-seven (157) pages).
(Continued)

Primary Examiner — Lisa M Caputo
Assistant Examiner — Janice M Soto
(74) Attorney, Agent, or Firm — Iandiorio Teska & Coleman, LLP

(57) ABSTRACT

The invention relates to a method of measuring turbulence in a high temperature fluid flow, comprising: applying different levels of cooling at different times to a region of a substrate in the high temperature fluid flow; and/or applying different levels of cooling at the same time to different regions of a substrate in the high temperature fluid flow and/or to regions on different substrates in the high temperature fluid flow, wherein the method further comprises: measuring fluctuations in the temperature of the region or regions of the substrate or substrates at each of the different levels of cooling; and using the measured fluctuations to
(Continued)

determining an amount of turbulence in the high temperature fluid flow and/or the size of temperature fluctuations in the high temperature fluid flow.

14 Claims, 6 Drawing Sheets

(51) Int. Cl.
  *G01P 13/00* (2006.01)
  *F01D 17/08* (2006.01)
(52) U.S. Cl.
  CPC .......... *G01M 15/102* (2013.01); *G01M 15/14* (2013.01); *G01P 13/006* (2013.01); *G01K 2013/024* (2013.01)

(56) References Cited

U.S. PATENT DOCUMENTS

| | | |
|---|---|---|
| 2004/0216532 A1 | 11/2004 | Koudal et al. |
| 2004/0231430 A1 | 11/2004 | Oomura et al. |
| 2009/0272187 A1 | 11/2009 | Sukegawa et al. |
| 2010/0170483 A1* | 7/2010 | Wienand ............... G01F 1/6842 123/568.12 |

FOREIGN PATENT DOCUMENTS

| | | |
|---|---|---|
| EP | 2249128 A1 | 11/2010 |
| GB | 1249373 | 10/1971 |
| GB | 1483204 | 8/1977 |
| GB | 1600323 | 10/1981 |
| GB | 2375177 A | 11/2002 |
| JP | H552614 | 3/1993 |
| WO | WO2004/046672 A1 | 6/2004 |

OTHER PUBLICATIONS

Lincoln P. Erm, "Modifications to a Constant-Temperature-Hot-Wire Anemometer System to Measure Higher-Order Turbulence Terms Using Digital Signal Processing" DSTO-TR-0506, STO Aeronautical and Maritime Research Laboratory, 1997, (forty (40) pages).

* cited by examiner

| $T_c(°C)$ | $T_w(°C)$ | $\overline{\dot{q}'^2}(W^2m^{-4})$ |
|---|---|---|
| 23.2 | 52.8 | 2,635,103.0 |
| 41.8 | 61.6 | 2,636,726.0 |
| 62.2 | 72.7 | 894,727.0 |
| 82.2 | 82.5 | 77,748.0 |

Slope = 1128

Intercept = 395,443

SENSOR FOR HIGH TEMPERATURE TURBULENT FLOW

The invention relates to measuring turbulent fluctuations in velocity and/or temperature in high temperature flows of fluid. The invention is particularly applicable to gas flows, for example in the region between the combustor and turbine in a gas turbine engine or in the exhaust system of high performance cars.

Turbulence sensors are known in which a wire is resistively heated by an electric current combined with a feed back circuit so as to be maintained at a temperature that is higher than that of the gas flow to be measured. Variations in the flow caused by turbulence result in a corresponding variation in the rate at which the flow carries heat away from the wire. The way in which the electrical control system responds to these variations can be analysed in order to obtain a measure of the turbulence. This approach requires relatively complex circuitry and data processing. Furthermore, the approach is limited to relatively low temperature (typically less than about 600K) and modest pressure environments due to the fragility of the wire. It cannot be used for measuring turbulence in the region between the combustor and turbine in a gas turbine engine or in the exhaust system of a high performance car.

Other sensors for use in high temperature flows are known, but they are typically complex and/or need to use exotic materials to be sufficiently robust at higher temperatures (such as the temperature encountered between the combustor and turbine of a gas turbine engine, which may for example be in the region of 2000K) and/or where high pressures are also present.

It is an object of the invention to at least partially address one or more of the problems with the prior art discussed above.

According to an aspect of the invention, there is provided a method of measuring turbulence in a high temperature fluid flow, comprising: applying different levels of cooling at different times to a region of a substrate in the high temperature fluid flow; and/or applying different levels of cooling at the same time to different regions of a substrate in the high temperature fluid flow and/or to regions on different substrates in the high temperature fluid flow, wherein the method further comprises: measuring fluctuations in the temperature of the region or regions of the substrate or substrates at each of the different levels of cooling; and using the measured fluctuations to determine an amount of turbulence in the high temperature fluid flow and/or the size of temperature fluctuations in the high temperature fluid flow.

Thus a method of measuring turbulence is provided in which a substrate is intrinsically maintained at a temperature lower than that of the high temperature fluid to be measured. This means that thermometry used to measure the temperature of the substrate can operate at a lower temperature than in systems which do not use any cooling. The range of thermometry techniques that can be used is expanded and/or the range of temperatures of fluid that can be measured is extended to higher temperatures. Furthermore, the method may not require a feedback control system to derive a measure of turbulence so could thus be implemented without complex circuitry. Furthermore, maintaining the temperature of the substrate below the temperature of the gas flow may mean that less exotic materials, for example ceramic materials, may be used and/or may extend the longevity and/or reliability of the sensor.

Modulating the cooling to obtain measurements of the temperature fluctuations of the substrate at different levels of cooling provides not only a measure of the turbulent velocity fluctuations but also a measure of the fluctuations in the temperature of the high temperature fluid, thereby providing a useful range of information about the flow. This feature is absent from practically all other means of measuring turbulence.

In an embodiment, the temperature measurements of the substrate or substrates are performed at or near the outer surface of the substrate or substrates.

The temperature measurements may be carried out by measuring the resistance of a resistive element. The resistive element may be calibrated beforehand to determine the variation of its resistance as a function of temperature. For example, in an embodiment, a ceramic substrate in combination with a platinum thin film resistor on its surface is used as the temperature sensor in the context of measuring turbulence and/or temperature fluctuations in the flow between the combustor and turbine of a gas turbine engine.

Alternatively or additionally, the temperature measurements may be carried out using thermocouples or other thermometry devices.

The cooling may be performed by driving a fluid coolant through one or more lumens in the substrate or substrates. The level of cooling may be varied by controlling the temperature and/or mass flow of the coolant and/or by varying the coupling (thermal resistance) between the coolant and the region to be measured. Alternatively or additionally, other mechanisms may be used for the cooling.

According to an alternative aspect of the invention, there is provided a turbulence sensor for use in high temperature fluid flows, comprising: a substrate; a cooling system configured to apply cooling to the substrate; a measuring system for measuring fluctuations in the temperature of the substrate; a control system for controlling the cooling and measuring systems in order to: apply a plurality of different levels of cooling to a region of the substrate at a corresponding plurality of different times, and measure the fluctuations in the temperature of the region of the substrate at each of the plurality of different levels of cooling; and a calculation unit for determining an amount of turbulence in the high temperature fluid flow and/or a size of temperature fluctuations in the high temperature fluid flow, based on the fluctuations in temperature measured at each of the plurality of different levels of cooling.

According to an alternative aspect of the invention, there is provided a turbulence sensor for use in high temperature fluid flows, comprising: one or more substrates; a cooling system configured to apply cooling to the one or more substrates; a measuring system for measuring fluctuations in the temperature of the one or more substrates in regions where different levels of cooling from the cooling system are applied; a calculation unit for determining an amount of turbulence in the high temperature fluid flow and/or a size of temperature fluctuations in the high temperature fluid flow, based on the fluctuations in temperature measured at each of the plurality of different levels of cooling.

Embodiments of the invention will now be described, by way of example only, with reference to the accompanying drawings in which corresponding reference symbols indicate corresponding parts, and in which.

Figure 1:
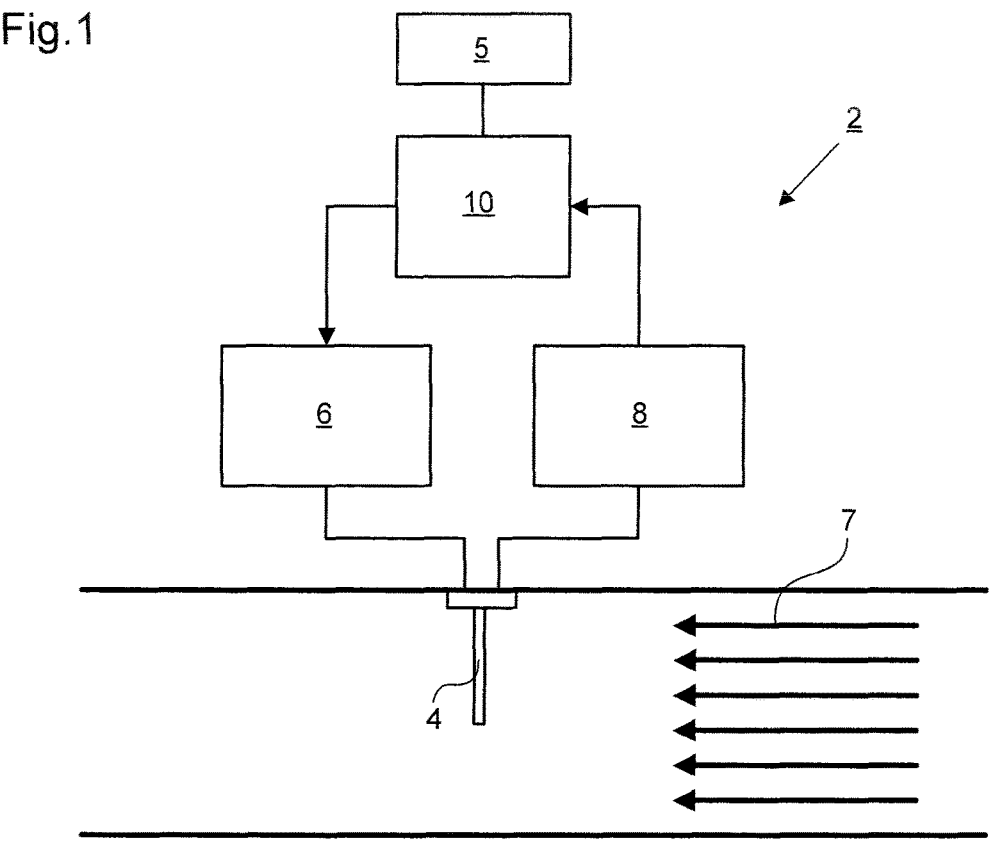
FIG. 1 depicts a turbulence sensor according to an embodiment.

FIG. 1 depicts a turbulence sensor 2 according to an embodiment. The sensor 2 comprises a substrate 4 to be positioned within the high temperature fluid flow 7. The substrate 4 may be formed from a ceramic or other heat resistant material, for example. The fluid flow may be a gas flow. The fluid flow may be at temperatures in the region of 2000K for example. For example, the flow may be a gas flow between the combustor and turbine in a gas turbine engine or in the exhaust system of a high performance car.

In an embodiment, the sensor 2 comprises a cooling system 6 for applying cooling to the substrate 4 in order to maintain the substrate 4 at a temperature that is substantially below that of the flow 7. The cooling system 6 may comprise a system for circulating a liquid or gas coolant through the substrate 4. In an embodiment, the cooling system 6 comprises a coolant temperature controller for controlling the temperature of the coolant that is circulated through the substrate 4. The cooling system 6 and/or substrate 4 may comprise one or more temperature sensors for monitoring the temperature of the coolant.

In an embodiment, the sensor 2 further comprises a measuring system 8 for measuring fluctuations in the temperature of the substrate 4 caused by turbulence in the flow 6. The fluctuations may be caused by variations in the flow rate of the fluid (a lower flow rate will tend to decrease the rate of transfer of heat from the flow 6 to the substrate 4 and a higher flow rate will tend to increase the rate of transfer of heat to the substrate 4) and/or by variations in the temperature of the fluid.

In an embodiment, the sensor further comprises a control system 10 for controlling the cooling system 6 and the measuring system 8 in order to measure fluctuations in the temperature of one of more regions of the substrate 4 while applying different levels of cooling to the one or more regions. This may be achieved by applying a first level of cooling to one region of a substrate 4 and, at corresponding one or more different times, applying one or more different levels of cooling to the same region of the substrate 4. Alternatively or additionally, the different levels of cooling may be achieved by applying a first level of cooling to a first region of the substrate 4 and, at the same time, applying one or more different levels of cooling to a corresponding one or more different regions of the same substrate 4 and/or of different substrates (all in the same high temperature fluid flow).

In an embodiment, a calculation unit 5 is provided for determining an amount of turbulence in the high temperature flow 7 based on the fluctuations in temperature measured at each of the plurality of different levels of cooling. The calculation unit 5 may also (or instead) be configured to measure fluctuations in the temperature of the high temperature fluid flow, which can also be derived from the measured fluctuations in substrate temperature at different levels of cooling. Example calculations are described in detail below.

One or more of the cooling system 6, measuring system 8, control system 10 and calculation unit 5 may be implemented using an appropriately programmed computer, including hardware such as a CPU, RAM and storage devices, such hardware being well known to the skilled person.

In an embodiment, the cooling system 6 is configured to provide a flow of coolant through the substrate 4 via a lumen 11 formed in the substrate 4.

Figure 2:
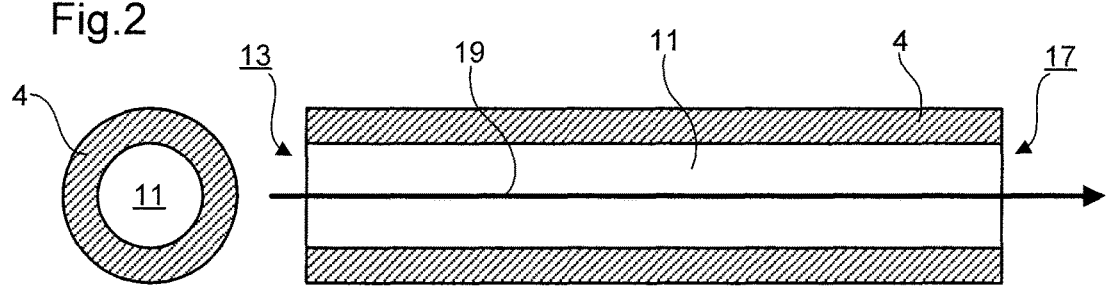
FIG. 2 depicts end and side sectional views of an example substrate having a single lumen with longitudinal openings at opposite ends of the substrate.

In an embodiment, the lumen 11 is configured to allow coolant to flow through the substrate 4 longitudinally, with the lumen having one or more openings on both longitudinal ends of the substrate 4. An example of such a configuration is illustrated in FIG. 2, which shows sectional end (left) and side (right) views of an example substrate 4. In this embodiment the lumen 11 has openings 13 and 17 at longitudinally opposite ends of the substrate 4. The cross-sectional shape of the lumen in this example remains uniform over the whole length of the substrate 4 (though this is not essential), which ensures a thermal resistance between the coolant and the outer surface of the substrate 4 that does not vary significantly as a function of longitudinal position along the substrate 4. Arrow 19 depicts a direction of coolant flow. Typically, a system of conduits will be provided for allowing the coolant flow to circulate between a coolant temperature control system (typically outside of the high temperature fluid flow) and the substrate 4. In such a system the coolant fluid would not therefore contaminate (or be contaminated by) the high temperature fluid flow. However, this is not essential. In other embodiments, the coolant could be allowed to escape into the high temperature fluid flow. In a further implementation, the coolant leaving the lumen 11 is arranged to pass directly over the region being measured on the surface of the substrate, thereby achieving a change in the temperature difference between the region being measured and the fluid flow over it.

Figure 3:
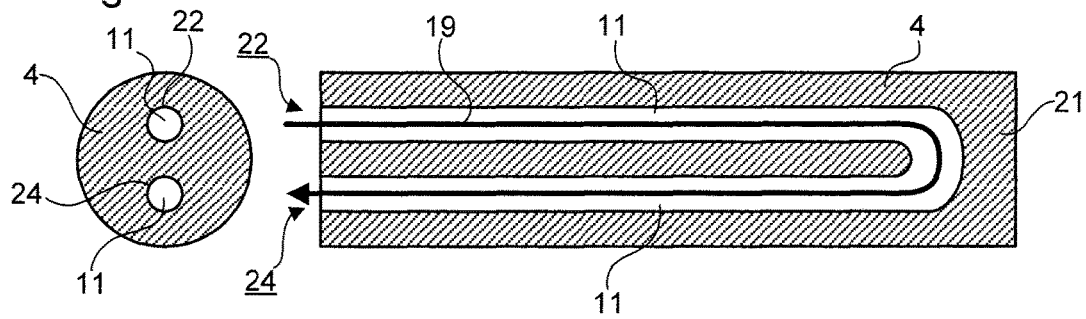
FIG. 3 depicts end and side sectional views of an example substrate having a lumen that loops back longitudinally, with entry and exit openings at the same longitudinal end of the substrate.

FIG. 3 depicts sectional end (left) and side (right) views of a further example substrate 4. In this embodiment the substrate 4 has a blind end 21, with the lumen 11 configured to have entry and exit openings 22 and 24 for coolant in only one longitudinal end of the substrate 4.

In the embodiments of FIGS. 2 and 3 the openings into the substrate 4 have circular cross-sections, but this is not essential. Other cross-sectional shapes may be used. The openings may have annular shapes. The substrate 4 may comprise a plurality of lumens.

In an alternative embodiment, the cooling is provided by moving the substrate or substrates from a position that is outside of the high temperature fluid flow (and at a lower temperature than the high temperature fluid flow) to a position that is within the flow. In this way, the different levels of cooling are achieved due to the gradual warming of the interior(s) of the substrate(s). The level of cooling will decrease continually as the average difference in temperature between the region being measured on the surface of the substrate(s) and the interior(s) of the substrate decreases (eventually reaching zero when all of the substrate(s) is/are at the same temperature as the high temperature fluid flow). In such an embodiment, it is preferable that the substrate or substrates is/are formed from a material having a relatively high heat capacity.

In an alternative embodiment, the variation in cooling is provided by changing the flow rate of a coolant through a lumen in the substrate 4. For example, coolant may be driven through the lumen at a first rate during a first time period and at a second rate during a second time period, with the temperature of the coolant being the same in both cases or different, and the first rate being different from the second rate. In an embodiment, the coolant may be driven through the lumen for the first time period and then stopped (such that the coolant is stagnant within the lumen or is not even present within the lumen). A continuum of different levels of cooling are then achieved because the interior of the substrate will gradually warm up and this will result in the level of cooling applied to the region being measured near the surface of the substrate gradually reducing as the temperature difference between the interior of the substrate and the region being measured reduces. This latter effect is similar to the case discussed above where the substrate is moved from a position that is outside of the flow to a position that is within the flow.

Figure 4:
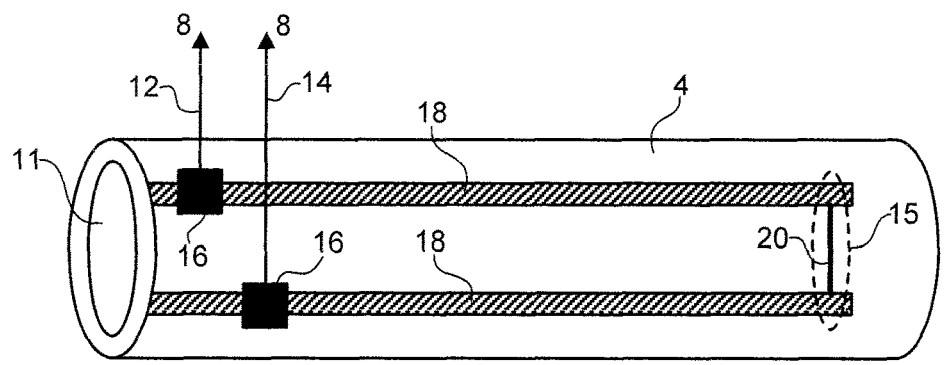
FIG. 4 is a side view of a substrate of an example turbulence sensor comprising a thin film temperature sensor for measuring the temperature in a region of the substrate.

FIG. 4 depicts how the temperature in a region 15 of the substrate 4 may be measured by measuring system 8 according to an embodiment in which a substrate 4 of the type illustrated in FIG. 2 is used. Here, conductive tracks 18 provide a connection to a calibrated resistive element 20 (e.g. a thin film platinum resistor calibrated for use as a thermometer). Each track 18 is connected via pads 16 and connections 12 and 14 to electronics associated with the measuring system 8, which are used to measure the resistance of the resistive element 20, for example by driving a current through the element 20 and measuring the resulting voltage. The measurements also need to be made at a frequency that is high enough to resolve the fluctuations associated with the turbulence that is being measured. Various methods for measuring the resistance of a resistive element to the required accuracy and at the required frequencies would be well known to the skilled person.

In the example of FIG. 4, measurements of the temperature of the region 15 at different levels of cooling can be carried out by changing the temperature of the coolant flowing through lumen 11. For example, coolant at temperature $T_1$ could be supplied from time $t_1$ to time $t_2$ and then coolant at temperature $T_2$ could be supplied from time $t_3$ to time $t_4$, where $t_3 > t_2$, $t_2 - t_1 = t_4 - t_3$ and $T_1 \neq T_2$, for example.

Measurements of fluctuations in the temperature in the region 15 can be taken during the periods of $t_1$ to $t_2$ and $t_3$ to $t_4$. This process can be repeated as necessary to obtain further measurements of the temperature fluctuations at different cooling levels. An alternative to this would be to change the coolant temperature continuously between limits, for example in a linear fashion, or in a sinusoidal way. A detailed example showing how such measurements can be used to obtain an estimate of the turbulence in the high temperature fluid flow are given further below.

Figure 5A:
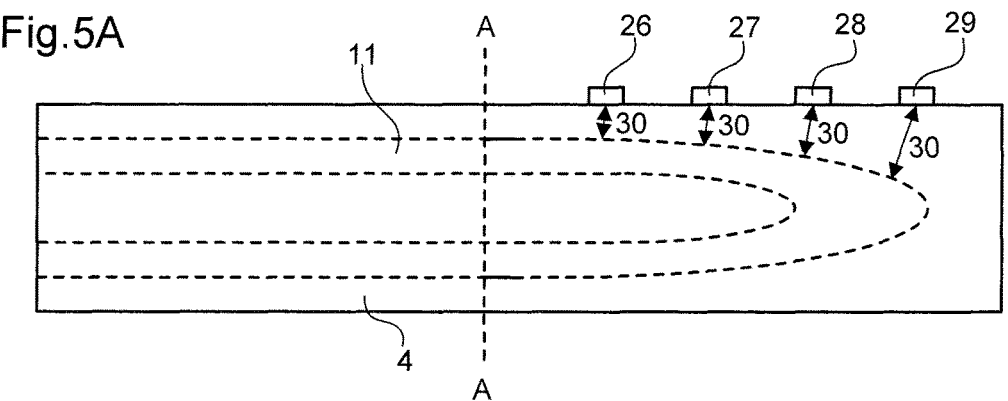
FIG. 5A depicts a side view of an example substrate with a looping back lumen and a plurality of temperature sensors with different thermal couplings (thermal resistances) to the coolant.

FIG. 5A depicts an alternative substrate 4 that allows measurements of the fluctuations in the substrate temperature to be obtained simultaneously at different cooling levels. Here, a plurality of temperature sensors 26-29 are provided that are each configured to measure the temperature of a region at the surface of the substrate that is coupled differently to the coolant flowing through lumen 11. In particular, the region of temperature sensor 26 is coupled more strongly to the coolant (via a shorter, and therefore lower thermal resistance, path 30) than the region of temperature sensor 27, which in turn is coupled more strongly than the region of temperature sensor 28, which in turn is coupled more strongly than the region of temperature sensor 29. Thus, in use, for a given temperature of coolant flowing through lumen 11, the signal from temperature sensor 26 will tend to fluctuate around a lower mean temperature than that of sensor 27, which will fluctuate around a lower mean temperature than that of sensor 28, which will fluctuate around a lower mean temperature than that of sensor 29. This feature may be combined with a means of moving (e.g. rotating the sensor, or moving it axially) to enable measurements to be achieved with corresponding sensors at the same location in the gas. For example, in the case of FIG. 5A, axial movement could be used to bring any one of the sensors 26-29 to the same position in the flow as any other one of the sensors 26-29. In a further embodiment, temperature sensors may be provided at different positions around the circumference of the substrate 4. An example of such an arrangement in shown in FIG. 5B, which is an axial sectional view perpendicular to the plane A-A marked in FIG. 5A (looking from left to right in the orientation of that figure). In this example, two temperature sensors 28A and 28B are provided at the same axial position but at different positions around the circumference of the substrate 4. Each of the sensors can be moved into the same position within the flow as the other sensor via a 90 degrees rotation of the substrate 4 (e.g. +90 degree to bring sensor 28B to the preceding position of sensor 28A and vice versa).

Figure 5B:
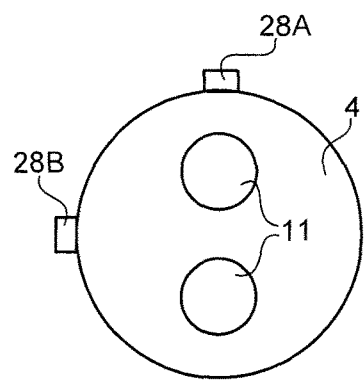
FIG. 5B is a sectional view perpendicular to the plane A-A in FIG. 5A depicting a variation in which temperature sensors are provided at different positions around a circumference of the substrate.
Figure 6:
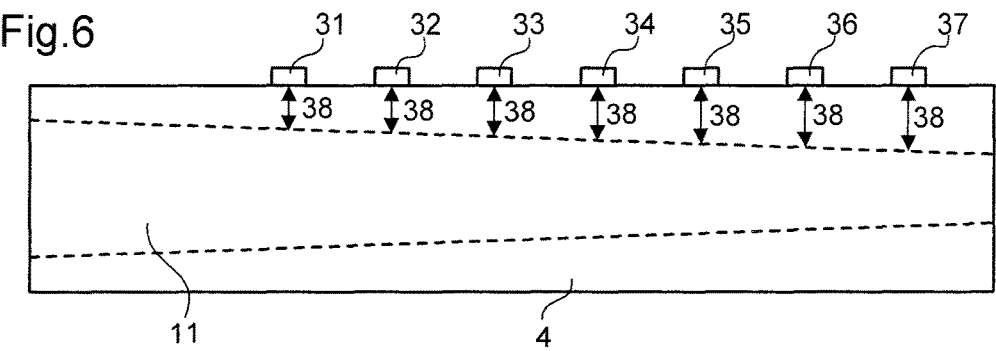
FIG. 6 depicts a side view of a further example substrate with a continuous lumen and a plurality of thermometers with different thermal couplings (thermal resistances) to the coolant.

In the example of FIGS. 5A and 5B, the substrate 4 is blind ended, with the lumen 11 having openings only on one longitudinal end of the substrate 4. However, simultaneously providing cooling at different levels to different regions of the substrate 4 can also be achieved in a substrate that has openings at both longitudinal ends. An example of such an arrangement is shown in FIG. 6. Here, the lumen 11 diameter is arranged to decrease from one end of the substrate 4 to the other. Thus, the thermal coupling to the sensors 31-37 decreases (the thermal resistance between the sensors 31-37 and the coolant increases) moving from sensor 31 towards sensor 37 as the wall thickness 38 increases. Thus, the mean temperature of the sensors will also increase moving from sensor 31 to sensor 37.

The example substrates 4 discussed above have a cylindrical form, but this is not essential. Any other shape could be used. The substrate 4 could in general have any orientation with respect to high temperature flow. For example, the substrate 4 could be arranged to have an axis of elongation that is parallel with the direction of flow of the high temperature fluid flow. Alternatively, the substrate 4 could be arranged to have an axis of elongation that is perpendicular to the direction of flow of the high temperature fluid flow, or at any other angle to the direction of flow of the high temperature fluid flow. Typically, however, the sensing elements will be positioned at the location of the flow stagnation point.

Figure 7:
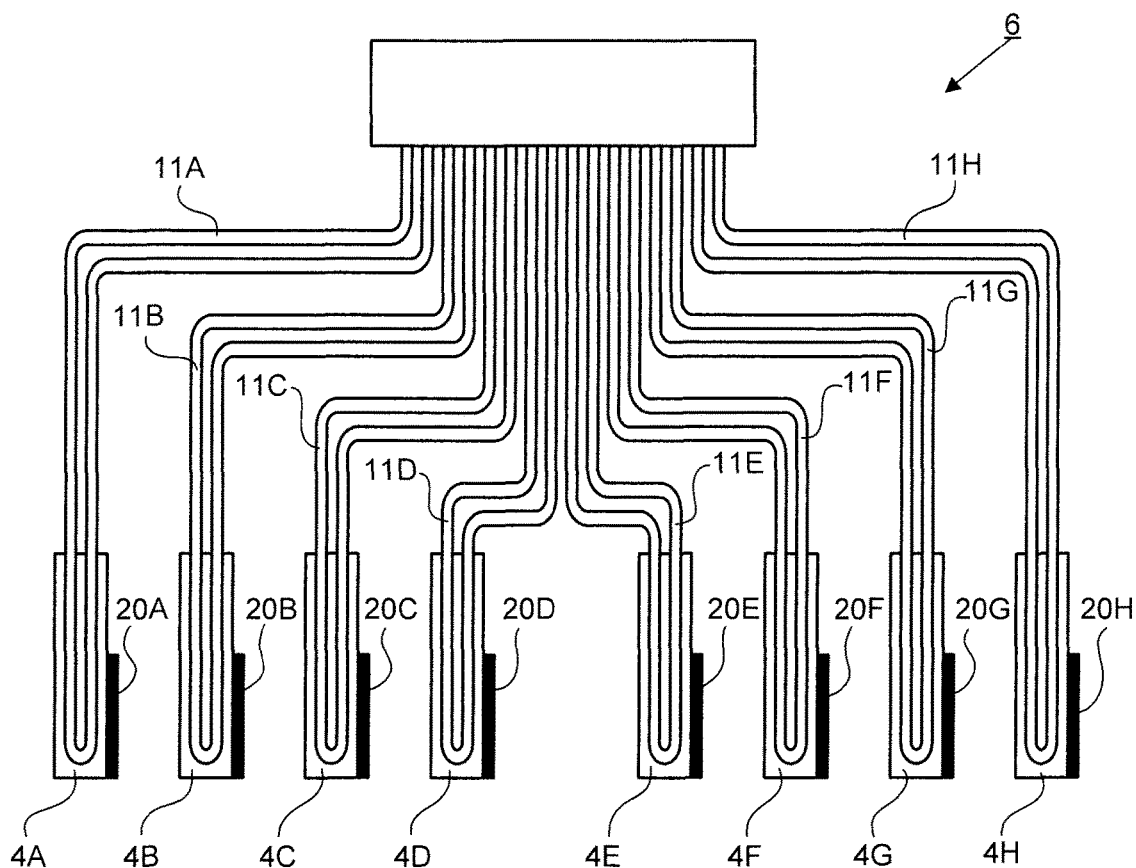
FIG. 7 depicts an example cooling system capable of simultaneously supplying coolant at different temperatures to different regions of a substrate and/or to different substrates.

In an embodiment, the cooling system 6 is arranged to provide different levels of cooling simultaneously to regions that are on different substrates. An example of such an arrangement is shown in FIG. 7. Here, the cooling system 6 comprises a plurality of different lumens 11A-H, each of which can be supplied independently with coolant at a temperature that is different to that of the coolant in some or all of the other lumens. Each of the lumens 11A-H is configured to provide the coolant to a different one of a plurality of substrates 4A-H, thus allowing a different cooling level to be applied simultaneously to each of the different substrates 4A-H. Each of the substrates 4A-H is provided with one or more temperature sensors 20A-H for measuring fluctuations in the temperature of a corresponding one or more regions of the substrate 4A-H. In the case where a plurality of temperature sensors are provided on each of the substrates 4A-H and are arranged to have different thermal couplings (thermal resistances) to the coolant (as in FIG. 5A, 5B or 6 for example), a large number of measurements at different levels of cooling may be obtained simultaneously. For example, if the arrangements of FIGS. 6 and 7 were combined, it would be possible simultaneously to make measurements of temperature fluctuations at 56 different levels of cooling. Making measurements at many different cooling levels will tend to increase the accuracy with which the turbulence can be derived, although it should be noted that the turbulence can vary with position in the subject flow field so where a plurality of temperature sensors are provided it is preferable for these to be positioned as close together as possible. Making the measurements simultaneously increases the data acquisition speed of the turbulence sensor. In circumstances where the sensor 2 is to be removed from the flow, for example during a testing phase, this may allow this to be achieved more quickly. Where the sensor 2 is to remain in the flow, this may improve the speed with which the sensor can react to changes in the turbulence, which may signal a fault for example and be used to initiate a suitable corrective action or alarm.

Figure 8:
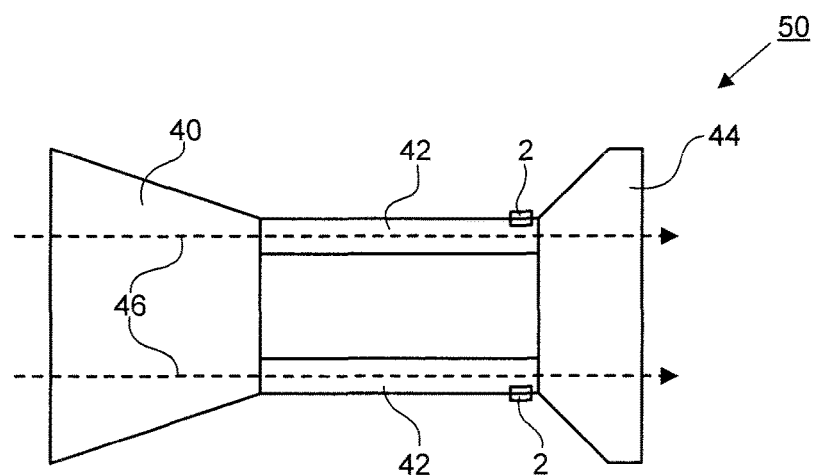
FIG. 8 depicts a portion of a gas turbine engine (or test rig) comprises turbulence sensors.
Figure 9:
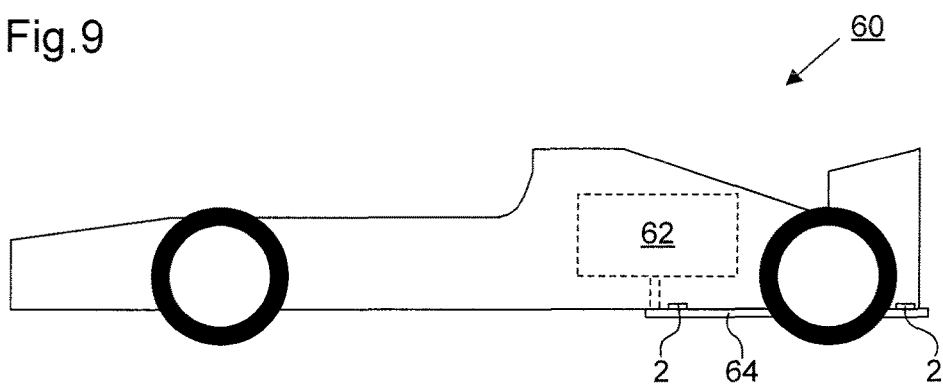
FIG. 9 depicts a high performance car comprising turbulence sensors for measuring turbulence in the exhaust system.

The turbulence sensor 2 may be applied to a gas turbine engine 50 for example or a test rig for designing or testing elements of a gas turbine engine. An example configuration is shown schematically in the side sectional view of FIG. 8. In this particular embodiment, the gas turbine engine or test rig 50 comprises a compressor 40, a combustor 42 and a turbine 44. The direction of gas flow through these elements is indicated by arrows 46. In this embodiment, turbulence sensors 2 are positioned so as to measure turbulence in the gas leaving the combustor 42 and before entry in the turbine 44.

In a further example the sensor 2 is configured for use in a vehicle 60 or test rig for designing or testing elements of a vehicle, for example a high performance racing car. The vehicle or test rig comprises an internal combustion engine 62 and an exhaust system 64. In such an embodiment, a turbulence sensor 2 may be positioned at one or more positions within the exhaust system to measure turbulence in gas flows in the exhaust system 64 or leaving the exhaust system 64.

The following description explains in further detail how the turbulence in the gas flow can be obtained from the measurements of fluctuations in the temperature of regions of the substrate subject to different cooling levels. The description is presented in the context of a cooling system that is based on driving a coolant through a lumen 11 in the substrate 4, but could be applied to other means of cooling.

The heat flow $\dot{Q}_1$ into a region of a substrate 4 from the high temperature fluid flow 7 will depend on the difference in temperature between the region of the substrate 4 and the fluid, and can be written as follows: $\dot{Q}_1 = A_g h_g (T_g - T_w)$, wherein $h_g$ is a heat transfer coefficient representing the thermal coupling (or thermal resistance) between the high temperature fluid and the region of the substrate 4, $T_g$ is the temperature of the high temperature fluid, $T_w$ is the temperature of the region of the substrate 4 being measured, and $A_g$ is the area through which heat flows. The region of the substrate may be a region at or near the surface of the substrate 4. Similarly, the heat flow $\dot{Q}_2$ out of the region of the substrate 4 into the coolant may be written as $\dot{Q}_2 = A_c h_c (T_w - T_c)$, where $h_c$ is a heat transfer coefficient representing the thermal coupling (or thermal resistance) between the coolant and the region of the substrate, T is the temperature of the coolant, and $A_c$ is the area through which the heat flows. In equilibrium the two heat fluxes must balance out on average, such that $\dot{Q}_1 - \dot{Q}_2 = 0$. From this, it follows that:

$$T_w = \frac{1}{1 + \frac{h_g A_g}{h_c A_c}} T_c + \frac{1}{1 + \frac{h_c A_c}{h_g A_g}} T_g \qquad (1)$$

Thus, there is a linear relationship between $T_w$ and $T_c$. A plot of $T_w$ against $T_c$, obtained for example by supplying coolant at different temperatures at different times, can thus be used to obtain average values of $h_g A_g / h_c A_c$ and $T_g$. The heat transfer coefficient $h_c$ can be determined by calibration measurements, in which case the linear plot can be used to determine an absolute value for $h_g$ as the area ratio $A_g/A_c$ will be determined by measurement. In this case, the gas temperature could then be readily determined from the intercept with the ordinate ($T_w$) axis as $h_g A_g / h_c A_c$ would be known. Alternatively, a simple least squares regression procedure could be applied to equation (1) to determine the most likely (best) values of $h_g$ and $T_g$.

In the case where different levels of cooling are provided by varying the thermal resistance between the coolant and the regions where $T_w$ is being measured (using substrates 4 of the type shown in FIGS. 5A, 5B and 6 for example), a different approach may be used for obtaining $h_g$ and $T_g$. For example, in an embodiment $T_g$ and the flow speed, $U_g$, are measured separately using different probes. For example, $T_g$ may be obtained from a thermocouple or other means, and $U_g$ may be obtained using a pitot or total pressure probe. Once $U_g$ is known, then it is possible to calculate $h_g$—either from a correlation, or from earlier calibration.

Figure 10:
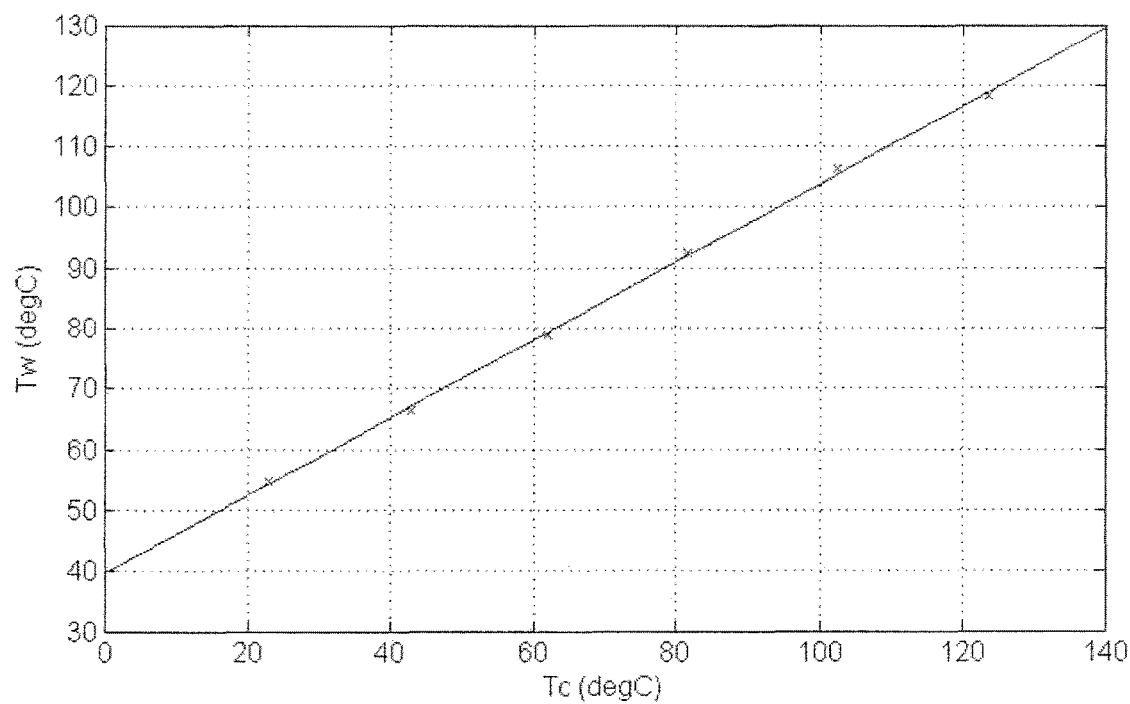
FIG. 10 is a graph of the measured temperature of a region on a substrate against the temperature of a coolant flowing through a lumen in the substrate.

FIG. 10 illustrates example data of $T_w$ against $T_c$ obtained using a substrate 4 configured according to the example shown in FIG. 4 and providing coolant at six different temperatures. As can be seen, the data points lie as expected along a straight line, the gradient and intercept of which can be used to obtain average values of $h_g$ and $T_g$ as discussed above. The slope is calculated as 0.642 from the graph and $$\frac{A_g}{A_c} = \left[\frac{8}{4.5}\right]^2,$$

from which $h_g/h_c$ can be calculated to be 0.155. The heat transfer coefficient $h_c$ was determined to be 1254 W/m²K, which leads to an $h_g$ of 195 W/m²K.

Conventional processing of the unsteady signal from the temperature sensor, $T_w$, can be used to calculate the unsteady heat flux $\dot{q}$. Example methods for determining $\dot{q}$ from $T_w$ are described in the literature—see for example Schultz, D. L. and Jones, T. V., 1973, "Heat-Transfer measurements in Short-Duration Hypersonic Facilities," AGARD-AG-165.

The fluctuation in the size of the heat flux from the high temperature fluid flow into the region of substrate 4 may be defined as $\dot{q}'_1 = \dot{q}_1 - \bar{\dot{q}}_1$, where $\dot{q}_1$ is the heat flux and $\bar{\dot{q}}_1$ is the average heat flux. The fluctuation in heat transfer coefficient $h'_g$ may be defined in a corresponding manner as $h'_g = h_g - \bar{h}_g$, the fluctuation in the temperature of the high temperature fluid $T'_g$ may be defined as $T'_g = T_g - \bar{T}_g$, and the fluctuation in the temperature of the region of the substrate 4 may be defined as $T'_w = T_w - \bar{T}_w$.

Figure 11:
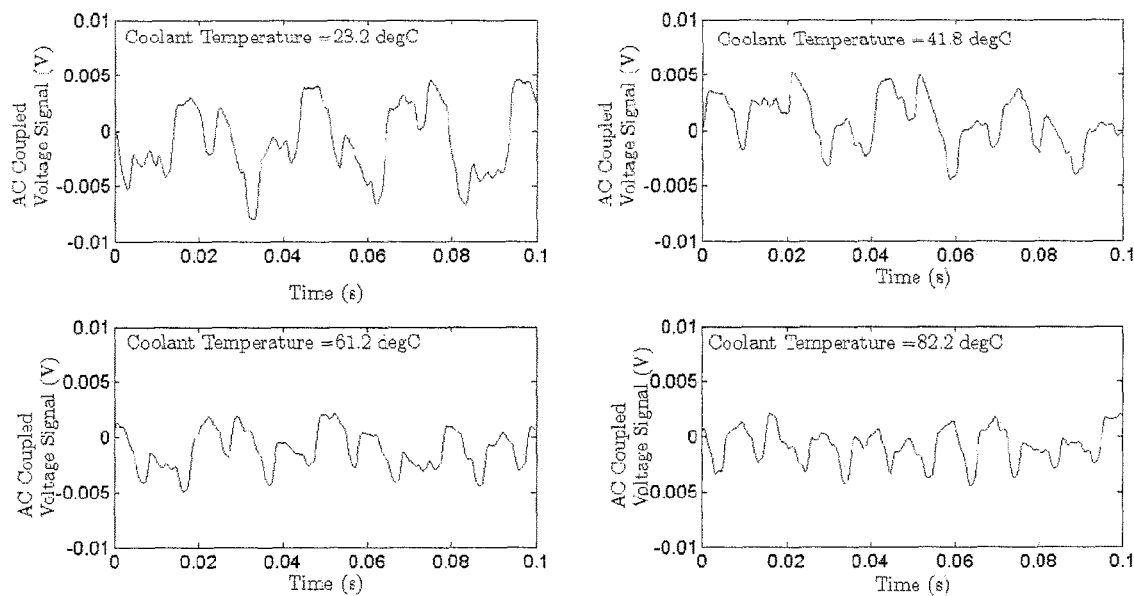
FIG. 11 shows fluctuations in a signal output from a temperature sensor as a function of time at different coolant temperatures.
Figure 12:
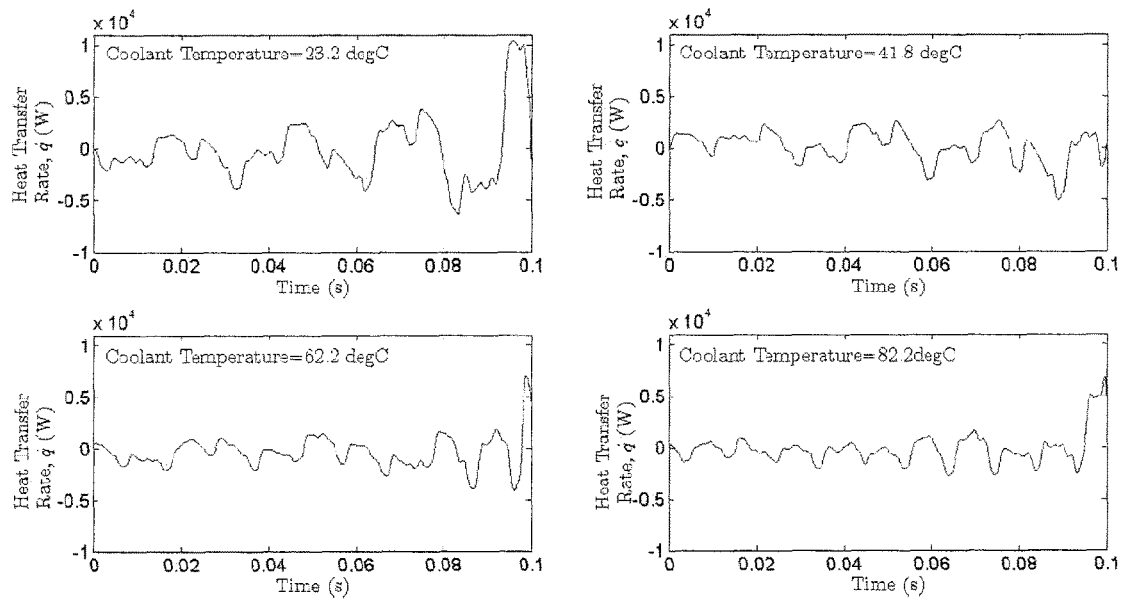
FIG. 12 shows fluctuations in heat flux into the substrate derived from the data of FIG. 11.

FIGS. 11 and 12 illustrate example data obtained using a substrate 4 configured according to the example shown in FIG. 4 and providing coolant at four different temperatures (top left=23.2 degrees C.; top right=41.8 degrees C.; bottom left=62.2 degrees C.; bottom right=82.2 degrees C.). FIG. 11 plots measurements of an AC coupled voltage signal obtained from a resistive temperature sensor 20 (which is directly related to the temperature of the sensor) against time. The fluctuations in the signal can be measured, thereby obtaining measurements of fluctuations in the temperature of a region of a substrate that is subject to four different levels of cooling. It should be noted that continuous (over time) changes in the coolant temperature could cause related changes in the sensor temperature which would be analysed following a different procedure. FIG. 12 plots corresponding values for the heat transfer rate (heat flux) $\dot{q}$ (obtained for example by solving the diffusion equation as discussed above) against time, from which the fluctuations $\dot{q}'$ can be obtained using $\dot{q}'_1 = \dot{q}_1 - \bar{\dot{q}}_1$ as discussed above.

Figures 13, 14:
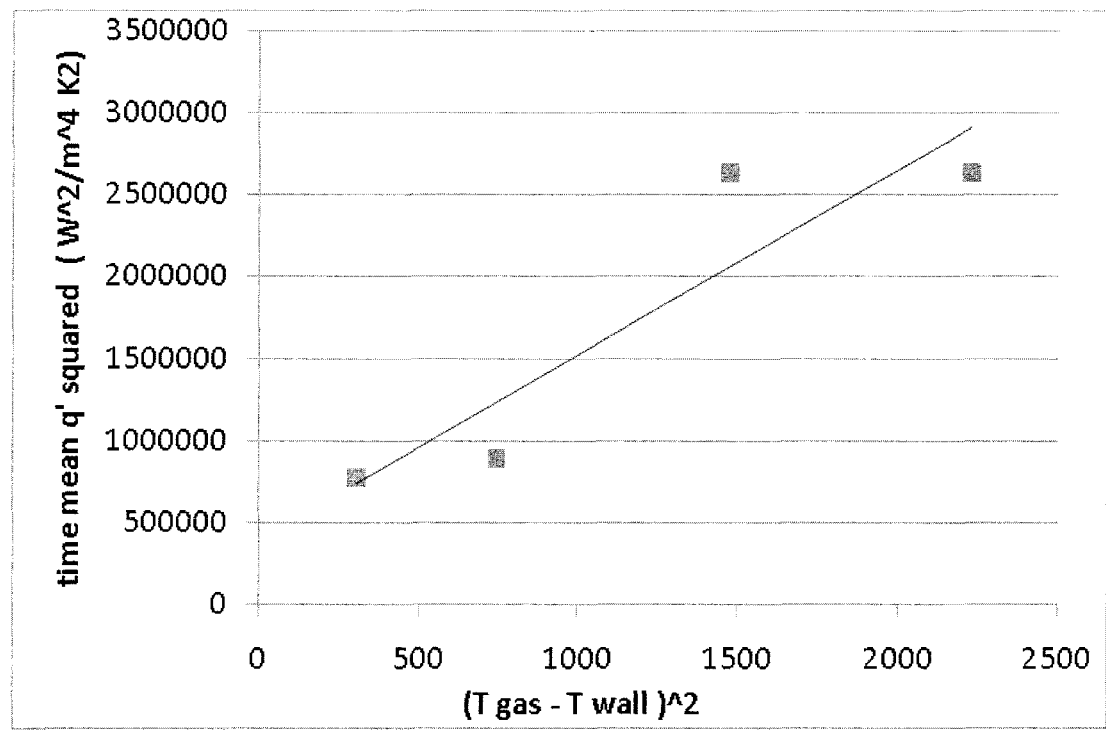
FIG. 13 is a table showing values of fluctuations in the heat flux into the substrate for different coolant temperatures.
FIG. 14 is a graph of the time mean heat flux fluctuations against the square of the temperature difference between the substrate and the high temperature fluid.

FIG. 13 is a table showing values for $T_c$, $T_w$ and $\overline{\dot{q}'^2}$ obtained from the data of FIGS. 11 and 12. FIG. 14 shows a plot of $\overline{\dot{q}'^2}$ against $(T_g - T_w)$ which can be used to provide values for $h'_g$ and $T'_g$. If the unsteady heat flux signal is squared, then averaged over a time period $\tau$, the following equation can be determined for the mean squared $h'_g$, mean squared $T'_g$, $\bar{h}_g$, $T_g$ and $T_w$:

$$\overline{\dot{q}'^2} = (\bar{T}_g - \bar{T}_w)^2 \overline{h'^2_g} + \bar{h}_g^2 \overline{T'^2_g}$$

This expression allows $h'_g$ and $T'_g$ to be determined from a plot of $\overline{\dot{q}'^2}$ against $(T_g - T_w)^2$. Alternatively, a regression procedure could be used to determine $\overline{h'^2_g}$ and $\overline{T'^2_g}$. An example of such a plot is shown in FIG. 14 for the example data of FIGS. 11-13. The slope is 1128 W²/m⁴K⁴ and the intercept is 395,443 W²/m⁴. The square root of the slope is calculated as 33.58 W/m²K. At this location, the time mean $\bar{h}_g$ had already been determined to be 180 W/m²K in a separate analysis using the procedure described above. Turbulence intensity can then be calculated from $$I = \frac{1}{n}\left[\frac{h'_g}{h_g}\right] = \frac{1}{0.633} \times \frac{33.58}{180} = 0.29$$

See below for further details about how the turbulence intensity I is defined and how n can be determined.

The time mean fluctuation in gas temperature follows from setting the intercept, 395,443 to $\bar{h}_g^2 \overline{T'^2_g}$ to yield $\overline{T'^2_g} = 395,443 \div [180^2]$ so that the root mean square gas temperature fluctuation is 3.49 degrees Celsius.

Thus, it has been shown that $h'_g$, which can be derived from measurements of the fluctuations in the temperature of a region or regions of a substrate or substrates that are each subjected to different levels of cooling (at the same or different times), can be used to obtain a measure of turbulence in the high temperature fluid flow; in the particular example described, the measure is the turbulence intensity I. It has also been shown that $T'_g$ can be derived, which is directly useful as a measure of the fluctuations in the temperature of the high temperature fluid flow.

Further Details about Turbulence Intensity

The turbulence intensity may be defined as $$I = \frac{\sqrt{\overline{u'^2}}}{U},$$

where $\sqrt{\overline{u'^2}}$ is the root-mean-square of the turbulent velocity fluctuations and $\overline{U}$ is the average speed, from which the following expression can be derived:

$$I = \frac{\sqrt{\overline{u'^2}}}{\overline{U}} = \frac{1}{n}\left(\frac{h'_g}{h_g}\right).$$

The average speed, $\overline{U}$, can be determined from the following empirical relation evaluating the fluid properties at $T_g$:

$$\overline{U} = \frac{\mu}{\rho D}\left(\frac{h_g D}{Ck}\right)^{1/n},$$

where $\mu$ is the dynamic viscosity of the fluid, $\rho$ is the density of the fluid, D is the outer diameter of the cylindrical sensor, and k is the thermal conductivity of the fluid. C is the constant of proportionality in the expression $Nu = CRe^n$, where Nu is the Nusselt number and Re is the Reynolds number. The exponent n can be derived from the Reynolds number for the flow, the correlation between n and the Reynolds number being available from published empirical studies by earlier workers for conventional shapes of probes such as cylinders. The probe could in principle take a variety of different shapes and further empirical studies could be performed as a matter of routine to obtain suitable data for the particular shape used. However, it may be desirable to use conventional shapes of probe, e.g. cylinders, in order to make use of data that is already available.

The invention claimed is:

1. A method of measuring turbulence in a high temperature fluid flow, comprising:
    applying different levels of cooling at different times to a region of a substrate in the high temperature fluid flow; and/or
    applying different levels of cooling at the same time to different regions of a substrate in the high temperature fluid flow and/or to regions on different substrates in the high temperature fluid flow,
    wherein a plurality of temperature sensors simultaneously measure fluctuations in a corresponding plurality of regions of the substrate or substrates to which different levels of cooling are being applied, wherein the different levels of cooling are applied by providing different thermal resistances between a coolant being driven through the substrate or substrates and different ones of the plurality of temperature sensors, wherein the method further comprises:

measuring fluctuations in the temperature of the region or regions of the substrate or substrates at each of the different levels of cooling; and using the measured fluctuations to determine an amount of turbulence in the high temperature fluid flow and/or the size of temperature fluctuations in the high temperature fluid flow.

2. A method according to claim 1, wherein the different levels of cooling at different times are achieved by driving a coolant that is at different temperatures at different times through a lumen in the substrate.

3. A method according to claim 1, wherein the different levels of cooling at different times are achieved by driving a coolant at different rates at different times though a lumen in the substrate.

4. A method according to claim 3, wherein coolant is driven through the lumen during a first time period and is not driven through the lumen during a second time period.

5. A method according to claim 1, wherein the different levels of cooling are applied by driving coolant at different temperatures through respective different ones of a plurality of lumens in the substrate or substrates.

6. A method according to claim 1, wherein two or more of the different levels of cooling are provided by moving the substrate or substrates from a position that is outside of the high temperature fluid flow, and therefore at a lower temperature than the high temperature fluid flow, to a position that is within the flow, the different levels of cooling being achieved due to the gradual warming of the interior(s) of the substrate(s).

7. A method according to claim 1, wherein the fluctuations in temperature are measured using one of the following: a thin film resistor formed on a surface of the substrate or substrates; a thermocouple.

8. A turbulence sensor for use in high temperature fluid flows, comprising:

one or more substrates comprising a plurality of different temperature sensors for simultaneously measuring the temperature at a corresponding plurality of different regions of the one or more substrates;

a cooling system configured to apply cooling to the one or more substrates and configured simultaneously to provide different levels of cooling to the plurality of different regions, wherein cooling system is configured to drive a coolant through a lumen formed in one or more of the plurality of substrates and two or more of the different levels of cooling are provided by correspondingly different levels of thermal resistance between the coolant and the regions;

a measuring system for measuring fluctuations in the temperature of the one or more substrates in regions where different levels of cooling from the cooling system are applied; and a calculation unit for determining an amount of turbulence in the high temperature fluid flow and/or a size of temperature fluctuations in the high temperature fluid flow, based on the fluctuations in temperature measured at each of the plurality of different levels of cooling.

9. A turbulence sensor according to claim 8, wherein the cooling system comprises a plurality of different lumens formed in the one or more substrates and is configured simultaneously to provide coolant at different temperatures to respective different ones of the plurality of lumens in order to provide two or more of the different levels of cooling.

10. A turbulence sensor according to claim 9, wherein cooling system is configured to drive a coolant through a lumen formed in one or more of the plurality of substrates and two or more of the different levels of cooling are provided by correspondingly different levels of thermal resistance between the coolant and the regions.

11. A turbulence sensor according to claim 10, wherein the different levels of thermal resistance are provided by different thicknesses of substrate material between the coolant and the temperature sensors.

12. A turbulence sensor according to claim 8, wherein the different levels of thermal resistance are provided by different thicknesses of substrate material between the coolant and the temperature sensors.

13. A turbulence sensor for use in high temperature fluid flows, comprising:

one or more substrates comprising a plurality of different temperature sensors for simultaneously measuring the temperature at a corresponding plurality of different regions of the one or more substrates, a cooling system configured to apply cooling to the one or more substrates and configured simultaneously to provide different levels of cooling to the plurality of different regions, wherein the cooling system comprises a plurality of different lumens formed in the one or more substrates and is configured simultaneously to provide coolant at different temperatures to respective different ones of the plurality of lumens in order to provide two or more of the different levels of cooling;

a measuring system for measuring fluctuations in the temperature of the one or more substrates in regions where different levels of cooling from the cooling system are applied; and a calculation unit for determining an amount of turbulence in the high temperature fluid flow and/or a size of temperature fluctuations in the high temperature fluid flow, based on the fluctuations in temperature measured at each of the plurality of different levels of cooling.

14. A method of measuring turbulence in a high temperature fluid flow, comprising:

applying different levels of cooling at different times to a region of a substrate in the high temperature fluid flow; and/or applying different levels of cooling at the same time to different regions of a substrate in the high temperature fluid flow and/or to regions on different substrates in the high temperature fluid flow, wherein two or more of the different levels of cooling are provided by moving the substrate or substrates from a position that is outside of the high temperature fluid flow, and therefore at a lower temperature than the high temperature fluid flow, to a position that is within the flow, the different levels of cooling being achieved due to the gradual warming of the interior(s) of the substrate(s), wherein the method further comprises:

measuring fluctuations in the temperature of the region or regions of the substrate or substrates at each of the different levels of cooling; and using the measured fluctuations to determine an amount of turbulence in the high temperature fluid flow and/or the size of temperature fluctuations in the high temperature fluid flow.

\* \* \* \* \*